Dec. 5, 1933.  E. JOHNSON  1,938,105
COMBINATION PARKING LIGHT MIRROR HOLDER
Filed Nov. 11, 1931
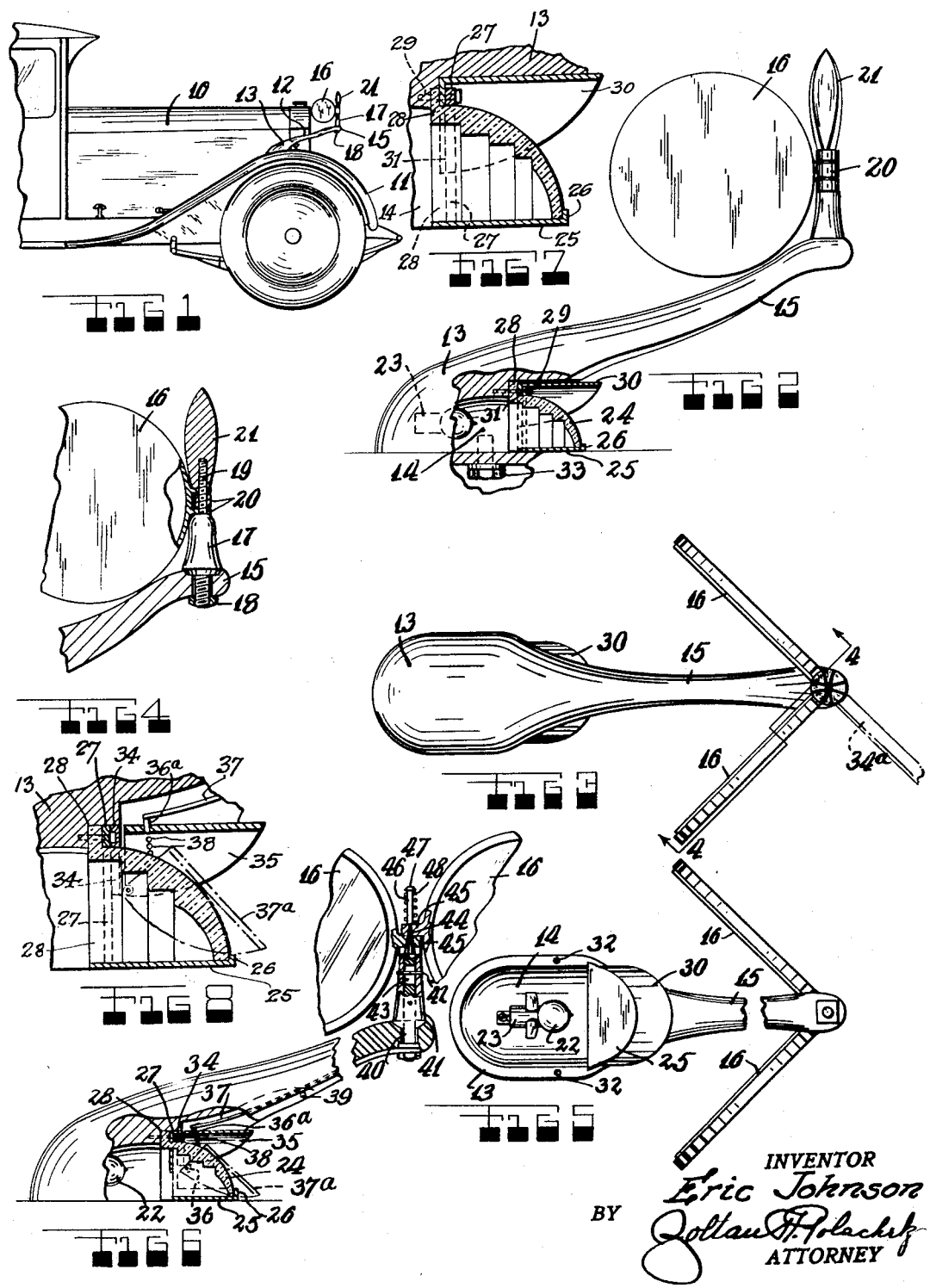
INVENTOR
Eric Johnson
BY
ATTORNEY Patented Dec. 5, 1933

1,938,105

UNITED STATES PATENT OFFICE 1,938,105

COMBINATION PARKING LIGHT MIRROR HOLDER

Eric Johnson, Astoria, Long Island, N. Y.

Application November 11, 1931.
Serial No. 574,320

5 Claims. (Cl. 240—7.1)

This invention relates to new and useful improvements in a combination parking light mirror holder.

The invention has for an object the construction of a parking light mirror holder which is characterized by a standard for attachment upon the front fender of a vehicle and having a large base with a hollow communicating with the front side, and a neck projecting forward over the hollow for the purpose of supporting the mirrors.

Moreover, a lamp should be mounted within the hollow for the purpose of acting as a parking light.

It is a still further object of this invention to mount the mirrors adjustably so that the driver of the vehicle may have several views to the rear and sides.

A still further object of this invention is to equip the lamp with an adjustable shield so that it may be set to prevent glare from the lamp being reflected by the mirrors into the vehicle driver's eyes.

A still further object of this invention is the provision of means for releasably holding the shield operable upon adjustment of the mirrors to necessitate the replacing of the shield in proper condition after each adjustment of the mirrors.

A still further object of this invention is the construction of a device of the class mentioned which is of simple, durable construction, dependable in use and efficient in action and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a fragmentary view of a vehicle provided with combination parking light mirror according to this invention.

Fig. 2 is an enlarged elevational view of a portion of Fig. 1, the portion thereof broken away to illustrate interior parts.

Fig. 3 is a plan view of Fig. 2.

Fig. 4 is a sectional view taken on the line 4—4 of Fig. 3.

Fig. 5 is a bottom view of Fig. 2 shown without the fender.

Fig. 6 is a view similar to Fig. 2 but illustrating a modified form of the invention.

Fig. 7 is an enlarged detailed fragmentary view of a portion of Fig. 2.

Fig. 8 is an enlarged detailed fragmentary view of a portion of Fig. 6.

A vehicle 10 has been illustrated having a fender 11 upon which a standard 12 from the combination parking light mirror holder is mounted. The standard 12 has a large base 13 with a hollow 14 extending across the bottom of the front side. A neck 15 projects from the large base and extends forward over the hollow 14. A pair of adjustable rear and side view mirrors 16 are mounted upon the free end of the neck 15. The adjustable mounting is accomplished by a vertical support member 17 secured upon the free end of the neck by the provision of a nut 18. The top of this member is formed with a reduced threaded portion 19 upon which lugs 20 from the mirrors 16 pivotally engage. A head member 21 is screwed on the threaded member 19 for the purpose of clamping the lugs 20 against each other and frictionally holding the mirrors in adjusted positions.

A lamp 22 is located within the hollow 14 and mounted in a lamp socket 23 attached within the hollow 14. The lamp socket 23 is intended for connection in the electrical lighting circuit of the vehicle which is not illustrated on the drawing since it forms no part of the invention. A translucent lens 24 is mounted across the front of the opening 14 to conclude the construction of the parking light. This lens is substantially ¼ of an egg shape. It is mounted with a bracket consisting of a flat base 25 of semi-elliptical shape and having an upturned flange 26 in which the lens engages. At the rear a vertical flange 27 from the base 25 extends around the lens 24 and against a flange 28 from the rear edge of the lens. Screws 29 engage through the flange 27 and into the metal of the standard for the purpose of holding the lens in place.

A shield 30 is adjustably mounted upon the flange 27 and is for the purpose of shielding rays from the lamp striking the view mirrors 16 and being reflected into the driver's eyes. The adjustable mounting is accomplished by a downturned rear edge 31 formed on the shield 30 and disposed in between the flange 27 and the flange 28. Adjustment is possible by forcibly moving the shield against the frictional holding of the flanges. Tapped openings 32 are formed in the bottom of the base 13 for the purpose of receiving screws 33 engaged through the bottom of the fender 11 of the vehicle to hold the device in place on the fender. Dot and dash lines 34ᵃ in Fig. 3 illustrate another adjusted position of one of the rear and side view mirrors 16 for the purpose of illustrating that they may be adjusted pivotally around the threaded member 19.

In the modified form of the device illustrated in Fig. 6, provision has been made for necessitating the adjustment of the light shield each time that a change in the position of the mirrors is made. More particularly, a channel-shaped strip 34 is slidably engaged upon the edge of the flange 27. A light shield 35 is located against one of the sides of the strip 34 and pivotally connected at its lower extremities upon lugs 36 formed upon the strip 34. This allows the shield to pivot downwards to a position illustrated by the dot and dash lines 37$^a$ and shade the parking light. Normally, the shield 35 is held in a raised position by a pin 36$^a$ from a lever 37 engaging in one of a plurality of openings 38 on the shield. The lever 37 is pivotally mounted at 39 on the neck 15. It extends in a cavity in the bottom of the neck to the front. There it is fixed upon a stud 40 slidably connected with an extension piece 41 fixedly mounted on the top of the neck. The slidable connection is accomplished by a pin 42 passing through a slot 43 in the stud. The stud 40 is formed with an intermediate conical clutch portion 44 engaging through corresponding openings in the lugs 45 of the mirrors 16. A stem 46 projects from the upper end of the conical portion 44 and terminates in a head 47. An expansion spring 48 works between the head 47 and the uppermost of the lugs 45 for urging the clutch portion 44 tight within the openings.

The clutch portion 44 serves to hold the mirrors 16 against pivoting. To pivot the mirrors, it is necessary to depress the head 47 whereupon the mirrors are free for adjustment. Depression of the head 47 lowers the stud 40 and consequently moves the lever 37 to cause the pin 36$^a$ to be retracted from the opening 38 and the shield 35 falls down to the position 37$^a$. The person adjusting the mirrors 16 has his attention called to, and must again lift the shield 35 to its normal position. At the same time the shield is moved to one side or the other by causing the strip 34 to slide along the flange 27 so that the shield prevents light from the lamp shining into one of the mirrors in the new adjusted position and striking the driver's eyes.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A parking light, comprising a standard for attachment upon the fender of a vehicle and having a large base formed with a hollow, a lamp within said hollow, a translucent lens closing the front of the hollow, a bracket supporting said lens, and a shield adjustably held in place by said bracket, said bracket having a base portion for resting on the fender, a flange portion for holding the lower edge of the lens, and a vertical flange portion for engaging around the lens.

2. A parking light, comprising a standard for attachment upon the fender of a vehicle and having a large base formed with a hollow, a lamp within said hollow, a translucent lens closing the front of the hollow, a bracket supporting said lens, and a shield adjustably held in place by said bracket, said bracket having a base portion for resting on the fender, a flange portion for holding the lower edge of the lens, and a vertical flange portion for engaging around the lens, said lens being formed with a corresponding flange located behind the flange of said bracket.

3. A parking light, comprising a standard for attachment upon the fender of a vehicle and having a large base formed with a hollow, a lamp within said hollow, a translucent lens closing the front of the hollow, a bracket supporting said lens, and a shield adjustably held in place by said bracket, said bracket having a base portion for resting on the fender, a flange portion for holding the lower edge of the lens, and a vertical flange portion for engaging around the lens, said lens being formed with a corresponding flange located behind the flange of said bracket, and said shield having a downturned rear edge frictionally engaged by the said flanges.

4. A parking light, comprising a standard for attachment upon the fender of a vehicle and having a large base formed with a hollow extending to the front, a lamp within said hollow, a translucent lens closing the front of the hollow, a bracket supporting said lens, a shield adjustably held in place by said bracket, and means for releasably holding said shield from pivoting across said lens.

5. A parking light, comprising a standard for attachment upon the fender of a vehicle and having a large base formed with a hollow extending to the front, a lamp within said hollow, a translucent lens closing the front of the hollow, a bracket supporting said lens, a shield adjustably held in place by said bracket, and means for releasably holding said shield from pivoting across said lens, including a pivoted lever having one end connected with a depressible stud, and having its other end normally holding the shield against pivoting.

ERIC JOHNSON.